US006377705B1

(12) United States Patent
Sato et al.

(10) Patent No.: US 6,377,705 B1
(45) Date of Patent: Apr. 23, 2002

(54) IMAGE PROCESSING APPARATUS AND METHOD AND COMPUTER-READABLE MEMORY

(75) Inventors: Mitsuhiko Sato, Numazu; Nobuo Sekiguchi, Shizuoka-ken, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/321,112

(22) Filed: May 27, 1999

(30) Foreign Application Priority Data

May 29, 1998 (JP) .......................................... 10-150010

(51) Int. Cl.$^7$ ................................................ G06K 9/48
(52) U.S. Cl. ...................................... 382/197; 382/306
(58) Field of Search ................................ 382/197, 289, 382/290, 296, 297, 294, 295, 298, 299, 301, 302, 305, 306; 358/488; 355/45

(56) References Cited

U.S. PATENT DOCUMENTS 4,857,966 A * 8/1989 Ishii et al. ..................... 355/45
5,149,977 A    9/1992 Mita ........................... 250/556
6,084,988 A * 7/2000 Kanno et al. ................ 382/289
6,137,905 A * 10/2000 Takaoka ...................... 382/173
6,173,088 B1 * 1/2001 Koh et al. ................... 382/289

FOREIGN PATENT DOCUMENTS

| EP | 0 725 359 | 8/1996 |
| GB | 2 295 455 | 5/1996 |
| JP | 8-212298 | 8/1996 |

* cited by examiner

Primary Examiner—Andrew W. Johns
Assistant Examiner—Seyed Azarian
(74) Attorney, Agent, or Firm—Fitzpatrick, Cella, Harper & Scinto

(57) ABSTRACT

An image processing apparatus with capabilities for determining the direction of image on an original document when said document is read by a reader. The direction of the image is automatically determined by performing character recognition of the characters associated with the image and thereby determining the direction of the characters. The image is then assumed to have the same direction as the characters, thus it is possible to read images of different directions and assembly them in a single direction for subsequent processing. The process can be adaptable to provide either processing speed or high productivity.

20 Claims, 18 Drawing Sheets

FIG. 9A
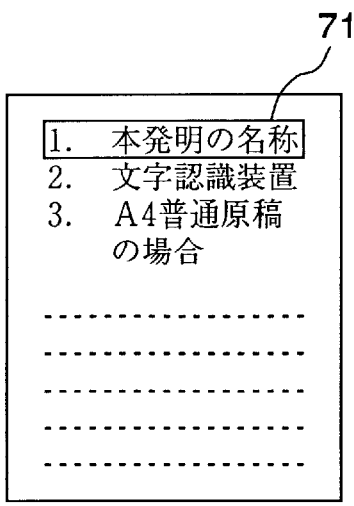
FIG. 9B
本発明の名称
FIG. 9C
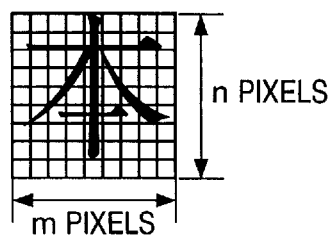
n PIXELS
m PIXELS
FIG. 9D
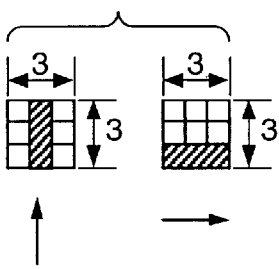

本発明の名称

| 0° | 90° | 180° | 270° |
|---|---|---|---|
| 本 | 本 | 本 | 本 |
| 本 | 町 | 克 | 式 |
| 0.90 | 0.40 | 0.30 | 0.50 |

RECOGNIZED CHARACTER
CONFIDENCE COEFFICIENT

FIG. 11A FIG. 11B FIG. 11C
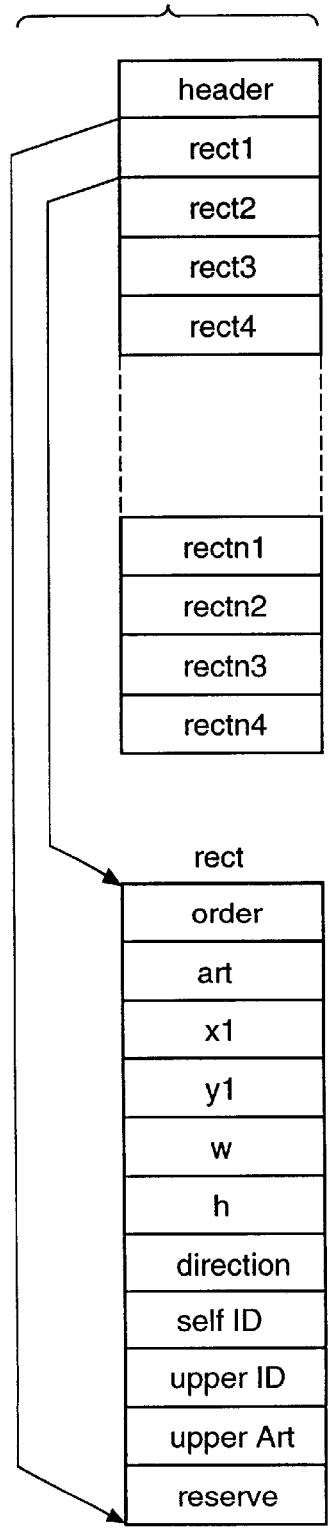
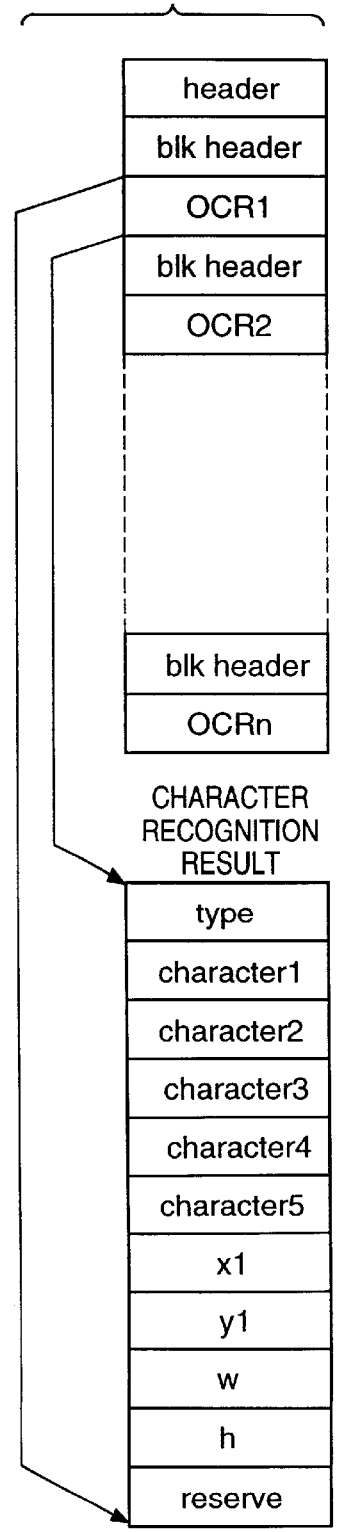

ID
IMAGE PROCESSING APPARATUS AND METHOD AND COMPUTER-READABLE MEMORY

BACKGROUND OF THE INVENTION

1. Field of the Invention

The present invention relates to an image processing apparatus capable of automatically determining the image direction.

2. Description of the Related Art

Conventionally, in reading an image on an original document using an image processing apparatus and converting the data into image data, the image data is recognized and stored along in the direction of the original document independent of the direction of the image on the original document. When image data need be recognized and stored in a direction different from the direction the original document, or images on originals set in various directions need be output in one direction, the user need to display the images on a computer display and then set each direction, one at a time. Therefore, the operation is very troublesome.

The present applicant has proposed a solution in Japanese Patent-Laid Open No. 8-212298. The solution is a method comprising a step of recognizing character data in image data, a step of determining the document direction on the basis of the character recognition result, and a step of rotating the image data automatically to arrange the image in the document direction.

However, in the above technique, timing for outputting the image direction determination result is not controlled on the basis of the timing of image input, such as at the time of the original reading, and the end of image direction determination processing must be waited for.

For example, the start of image reading operation for the next original is delayed by the time required for the series of operations by the document direction determination means to execute character recognition and determine the document direction. For this reason, especially when originals are continuously fed to the image processing apparatus by an automatic document feeder section and converted into image data, the productivity (read count per unit time) may be considerably lower than when compared to processing without document direction determination.

SUMMARY OF THE INVENTION

The present invention has been made to solve the above problem, and has as its object to provide an image processing apparatus capable of determining the document direction while maintaining high productivity. It is another object of the present invention to provide a convenient image processing apparatus capable of switching between priority of document direction determination accuracy or document reading productivity.

In order to achieve the above objects, according to the present invention, there is provided an image processing apparatus characterized by comprising image input means for inputting image data, image direction determination means for determining the image direction of the image data input by the image input means, and control means for controlling the image direction determination means to output an image direction determination result at a predetermined timing based on operation of the image input means.

According to the present invention, there is also provided an image processing apparatus characterized by comprising image input means for inputting image data, image direction determination means for determining an image direction of the image data input by the image input means, and control means for, when input of second image data is started by the image input means during image direction determination processing for first image data input by the image input means, controlling the image direction determination means to output an image direction determination result of the first image data at that time point and start image direction determination processing for the second image data.

According to the present invention, there is also provided an image processing method characterized by comprising the image input step of continuously inputting a plurality of images, the image direction determination processing step of determining an image direction of a first image input in the image input step, an interrupt step of interrupting the image direction determination processing step in accordance with an input timing of a second image in the image input step, and the determination result output step of outputting image directions determined until the interrupt.

According to the present invention, there is also provided a computer-readable memory characterized by comprising a program module of the image direction determination processing step of determining an image direction, a program module of the interrupt step of interrupting the image direction determination processing step, and a program module of the determination result output step of outputting image directions determined until the interrupt.

According to the present invention, there is also provided a computer-readable memory which stores control program modules for controlling image direction determination means for determining an image direction of image data, characterized by comprising a program module of the detection step of detecting input of an image whose image direction is to be determined by the image direction determination means, and a program module of the instruction step of instructing the image direction determination means to output an image direction determination result at a predetermined timing in response to image input detected in the detection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A to 9D are views showing steps of character recognition processing;

FIGS. 11A to 11C are views showing edit data obtained by document direction determination processing;

DETAILED DESCRIPTION OF THE PREFERRED EMBODIMENTS

Preferred embodiments of the present invention will be described below in detail with reference to the accompanying drawings. The relative arrangement of constituent elements or program modules and numerical values of resolution and the like are not limited to these embodiments unless otherwise specified.

[First Embodiment]
<System Arrangement>

Figure 2:
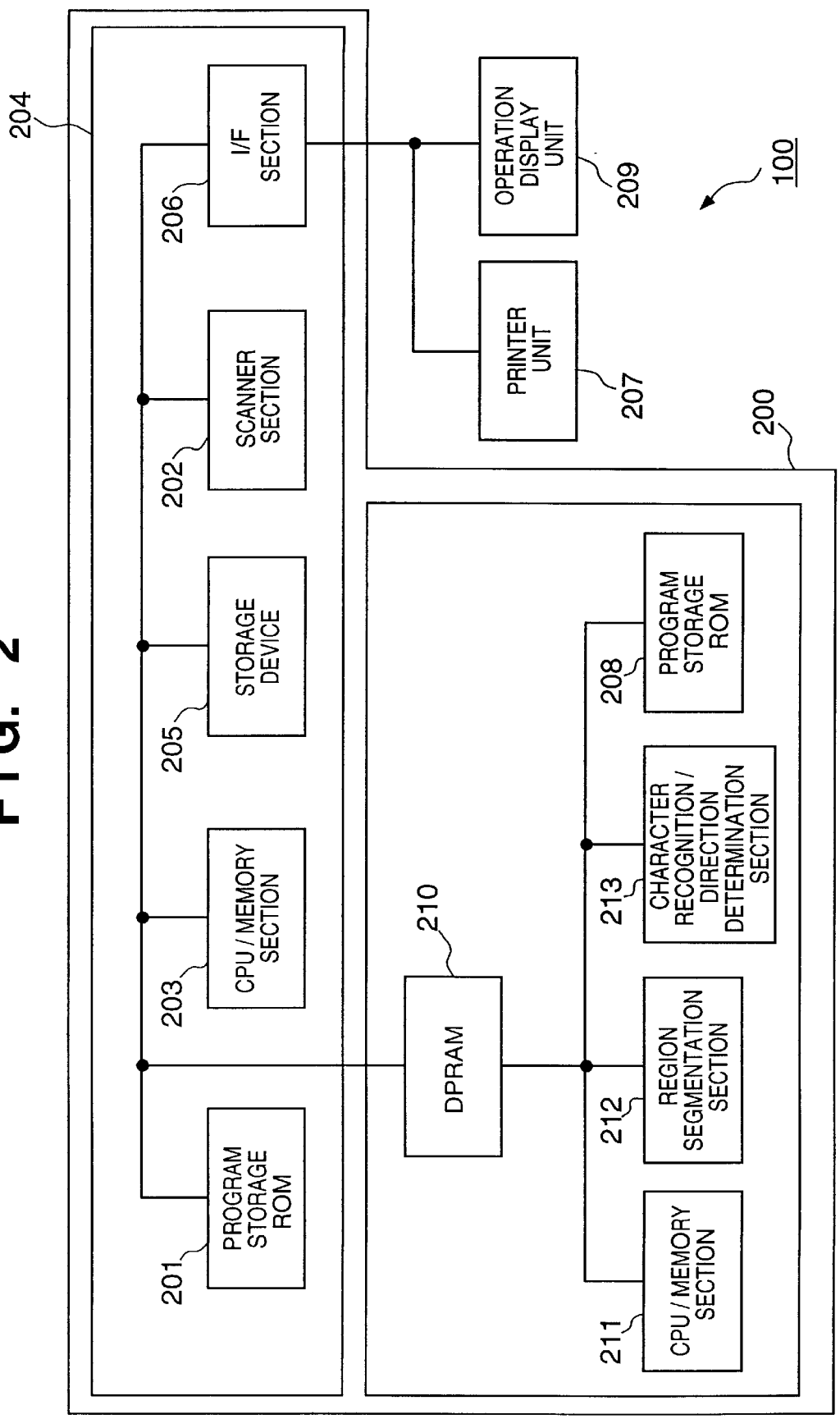
FIG. 2 is a block diagram showing a schematic arrangement of an image processing system 100 according to the first embodiment of the present invention.

FIG. 2 is a block diagram showing the schematic arrangement of an image processing system 100 according to the first embodiment of the present invention. As shown in FIG. 2, the image processing system 100 of this embodiment is constructed by connecting a print unit 207 and an operation display unit 209 to an image reading unit 200. The image reading unit 200 comprises an image reading/control section 204 and an automatic document direction determination section 214. The print unit 207 prints an image read by the image reading unit on a paper sheet. The operation display unit 209 mainly instructs to start or interrupt the reading operation.

The constituent elements of the image reading/control section 204 will be described first. A scanner section 202 optically reads a document original, photoelectrically converts it, and receives it as digital image data. The scanner section 202 has an automatic document feeding function of sequentially reading a plurality of document originals. A CPU/memory section 203 controls the entire image processing system 100 and, more specifically, constituent elements of the image reading/control section 204: a program storage ROM 201, the scanner section 202, a storage device 205, and an I/F section 206. The program storage ROM 201 stores a control program for the CPU/memory section 203 and fixed values and the like. The storage device 205 is formed from, e.g., a hard disk or a magnetooptical disk and stores various processing results (image data or document direction detection result). The I/F section 206 performs protocol control for communication with an external device.

The automatic document direction determination section 214 will be described next. A character recognition/direction determination section 213 recognizes characters from four directions of, e.g., 0°, 90°, 180°, and 270°, obtains the confidence coefficient of character recognition, i.e., the degree of matching with the character feature distribution (pattern) in each direction, and detects the direction with the highest confidence coefficient as a document direction. As preprocessing of character recognition/direction determination processing by the character recognition/direction determination section 213, a region segmentation section 212 segments input image data into rectangular regions such as a character portion, graphic potion, natural image portion, and table portion on the basis of attributes and adds attribute data to image data in each region. A CPU/memory section 211 controls a program storage ROM 208, the region segmentation section 212, and character recognition/direction determination section 213. A control program for this purpose is stored in the program storage ROM 208. A DPRAM 210 serves as a communication I/F to the image reading/control section 204. Through this DPRAM 210, an instruction for starting or interrupting document direction determination processing or image data whose direction need be determined is received, and the image reading/control section 204 is notified of the document direction determination result.

Figure 3:
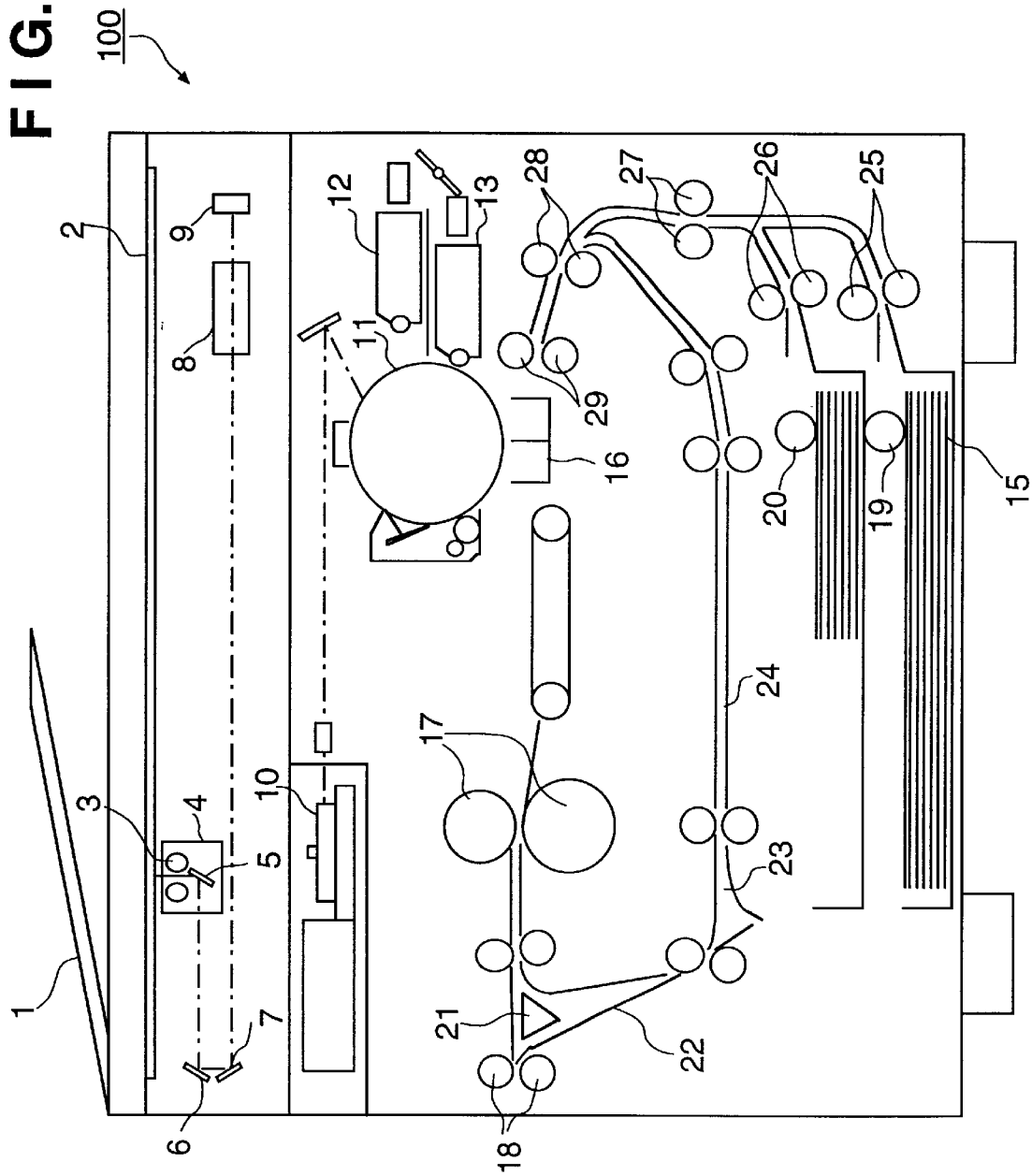
FIG. 3 is a sectional view showing the structure of the image processing system of the first embodiment of the present invention.

FIG. 3 is a schematic sectional view showing the structure of the image processing system according to the first embodiment. The operation of this system as a copying machine will be described.

Referring to FIG. 3, when a copy key (not shown) is depressed, an original placed on an automatic document feeder section 1 is fed onto an original table glass 2, the lamp of a scanner 3 is turned on, and a scanner unit 4 moves to illuminate the original. The reflected light from the original passes through a lens 8 through mirrors 5, 6, and 7 and is input to an image sensor section 9 formed from a CCD sensor. The members 1 to 9 correspond to the scanner section 202 shown in FIG. 2. The copy key is one of several keys on the operation display unit 209. The visible image input to the image sensor section 9 is photoelectrically converted and processed by the CPU/memory section 203 as digital image data. The processed image is temporarily stored in the storage device 205 (not shown), read out by the CPU/memory section 203 at the printing timing, and input to an exposure control section 10. An optical signal corresponding to the image data is output from the exposure control section 10 to irradiate a photosensitive medium 11. A latent image formed on the photosensitive medium 11 by irradiation is developed by a developing device 12 or 13 into a visible toner image. Transfer paper sheets are stored in a paper cassette 14 and a cassette 15. The paper sheets are conveyed to the position of feed rollers 25 or 26 by retard rollers 19 or 20, separated by the feed rollers 25 or 26, and conveyed to registration rollers 29 by conveyance rollers 27 and 28. The registration rollers 29 rotate in synchronism with the toner image formed on the photosensitive medium 11. The toner image is transferred to the transfer paper sheet by a transfer/separation device 16. The transferred toner image is fixed to the transfer papery sheet by a fixing section 17 and discharged from the apparatus through a discharge section 18. In double-side copying for transferring images onto both surfaces of a transfer paper sheet, a transfer paper sheet with an image formed on one surface is conveyed to double-side conveyance sections 22, 23, and 24 by a flapper 21. The paper sheet reaches the registration rollers 29 again through the conveyance rollers 28 to form an image on the lower surface and then is discharged from the apparatus through the fixing device 17 and discharge section 18.

<Reading Operation of System>

The image reading operation of the system will be briefly described next.

Figure 4:
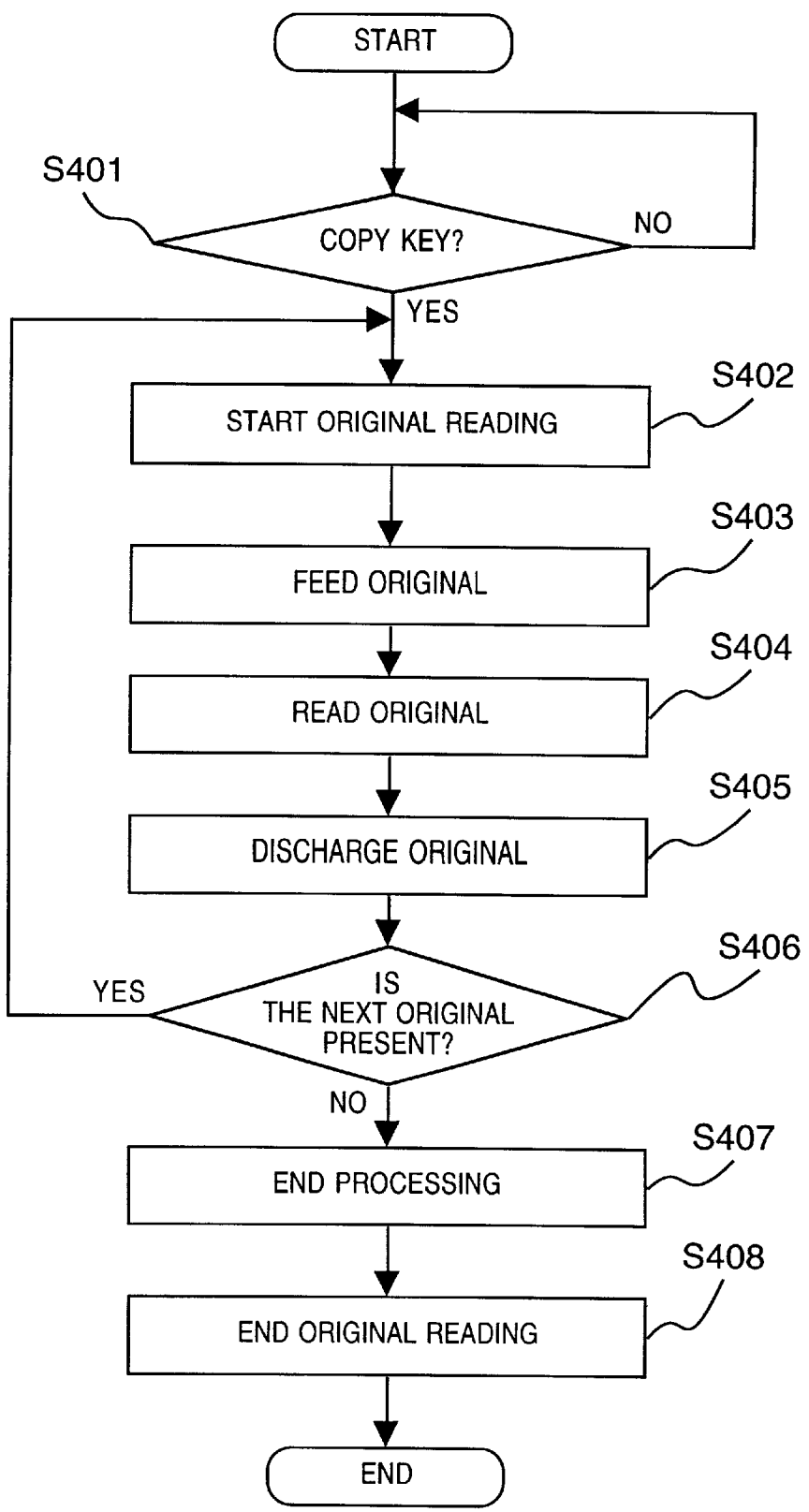
FIG. 4 is a flow chart schematically showing image read processing using an automatic document feeder section 1 of an image reading unit 200 in the first embodiment of the present invention.

FIG. 4 is a flow chart schematically showing image read processing using the automatic document feeder section 1 of the image reading unit 200.

When the copy key is depressed (S401), a read original start event occurs (S402). Simultaneously, an original is automatically fed onto the original table glass 2 (S403), and the image reading unit 200 reads the original image (S404). When the reading operation is over, the original on the original table glass 2 is automatically discharged (S405) and placed at the initial position on the automatic document feeder section 1 again. If an interrupt occurs during this time, e.g., a stop key (not shown) on the operation display unit 209 in FIG. 2 is depressed or jam occurs during original conveyance, the flow advances to step S407 to generate an original reading end signal and then perform end processing. Without any interrupt, the next original is detected (S406). If the next original is present, a read original start event occurs (S402) to feed and read the next original (S403 and S404). If the next original is not present, and it is determined that the images of all originals placed on the automatic document feeder section 1 have been read, end processing is performed (S407), and an end read original event occurs (S408).

Event monitoring processing in the first embodiment will be described next.

Figure 1:
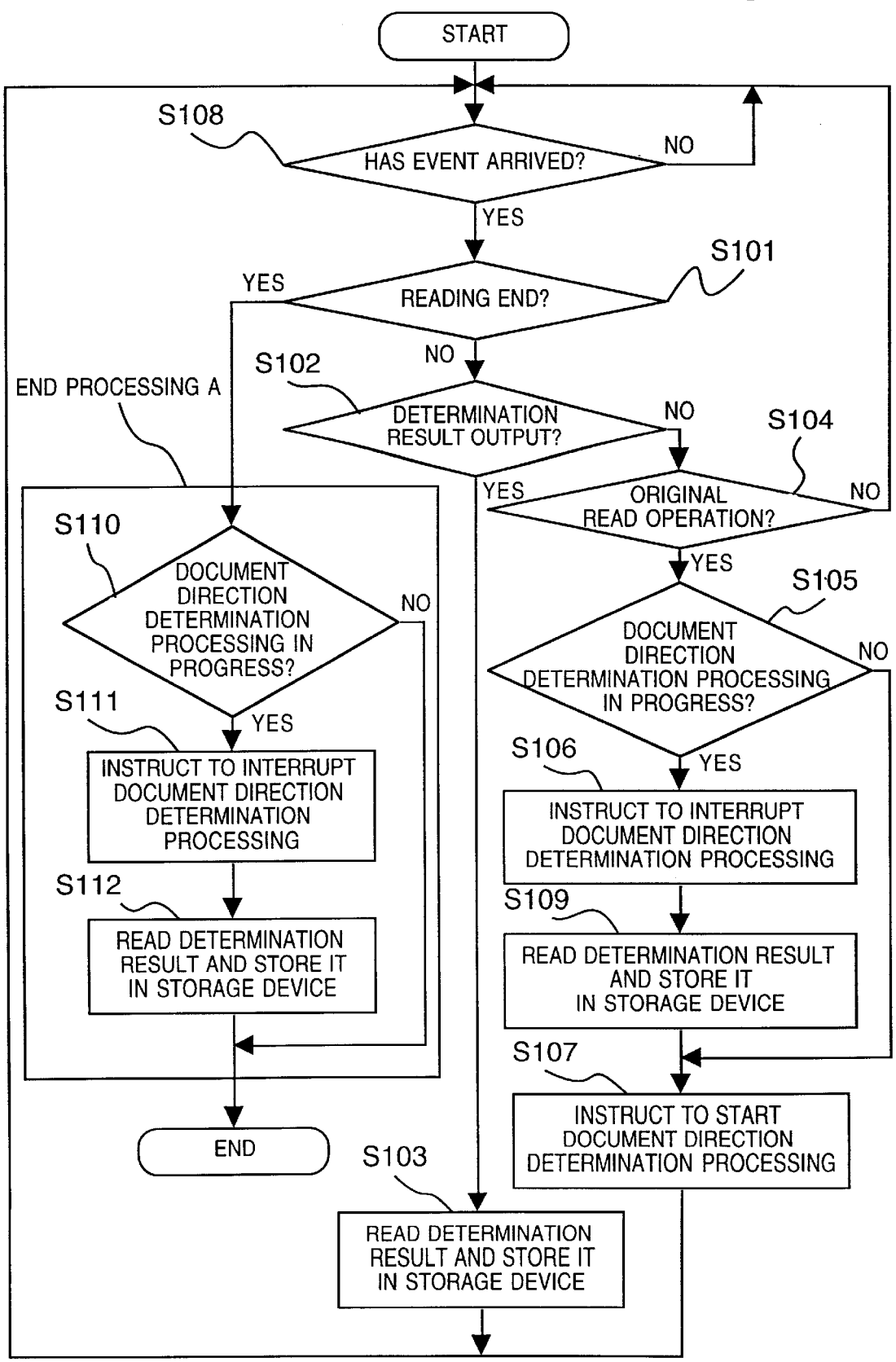
FIG. 1 is a flow chart showing the flow of event monitoring processing by an image reading/control section 204 in the first embodiment of the present invention.

FIG. 1 is a flow chart showing the flow of event monitoring processing by the image reading/control section 204. Control shown in this flow chart partially constructs the program stored in the program storage ROM 201 shown in FIG. 2 and best illustrates the characteristic feature of the first embodiment. The program of this flow chart is executed simultaneously with the start of original read processing (S401 in FIG. 4). First, in step S108, events from the scanner section 202 (automatic document feeder section 1) and automatic document direction determination section 214 are awaited.

The occurrence of any one of three events is awaited by this program.

Event A. The end of read processing for all originals in the scanner section 202

Event B. Output of a document direction determination result from the automatic document direction determination section 214

Event C. The start of read original operation by the scanner section 202

These events A, B, and C occur, respectively, when a bundle of originals comprised of a plurality of sheet materials set in the scanner section 202 are completely read (S408 in FIG. 4), when document direction determination processing by the automatic document direction determination section 214 has ended and a determination result is output, and when the read original operation is started (S402 in FIG. 4).

When an event occurs, it is checked in step S101 whether or not the event is event A "the end of read processing for all originals in the scanner section 202". If YES in step S101, the program ends. If NO in step S101, the flow advances to step S102. It is checked in step S102 whether or not the event is event B "output of a document direction determination result from the automatic document direction determination section 214". If YES in step S102, the flow advances to step S103 to store the determination result in the storage device 205, and the flow returns to step S108. If NO in step S102, then the flow advances to step S104. It is checked in step S104 whether or not the event is event C "the start of original reading operation by the scanner section 202". If NO in step S104, the flow returns to step S108. If YES in step S104, the flow advances to step S105. It is checked in step S105 whether or not the automatic document direction determination section 214 is determining the document direction. If YES in step S105, the flow advances to step S106 to instruct the automatic document direction determination section 214 to interrupt document direction determination processing, and then, the flow advances to step S109. In step S109, the document direction determination result received from the automatic document direction determination section 214 is read out and stored in the storage device 205, and the flow advances to step S107. If NO in step S105, the flow advances to step S107. In step S17, the automatic document direction determination section 214 is instructed to start document direction determination processing, and the scanner section 202 is instructed to start the original reading operation. Then, the flow returns to step S108.

When the copy key is depressed, and this program is executed, the reading start event for the first original takes place. The flow advances from step S108 to step S105 through steps S101, S102, and S104. At this time point, document direction determination processing has not yet been started. Hence, the flow advances from step S105 to step S107 to send a document direction determination processing start instruction to the automatic document direction determination section 214 (S107). When document direction determination processing for the first original ends before the start of original reading of the second original, the flow advances from step S108 to step S103 through steps S101 and S102. The determination result is read and stored in the storage device 205 in association with the first original image data.

If reading of the second original starts before the document direction determination result of the first original is outputted, the flow advances from step S108 to step S105 through steps S101, S102, and S104. Since document direction determination processing is being executed, the flow advances to step S106 to instruct the automatic document direction determination section 214 to interrupt document direction determination processing. Upon receiving this interrupt instruction, the automatic document direction determination section 214 interrupts determination processing and outputs a determination result at that time point. The determination result of the first original is read and stored in the storage device 205, in association with the original image data (S109). The automatic document direction determination section 214 is instructed to start document direction determination processing for the second original (S107).

Figure 5:
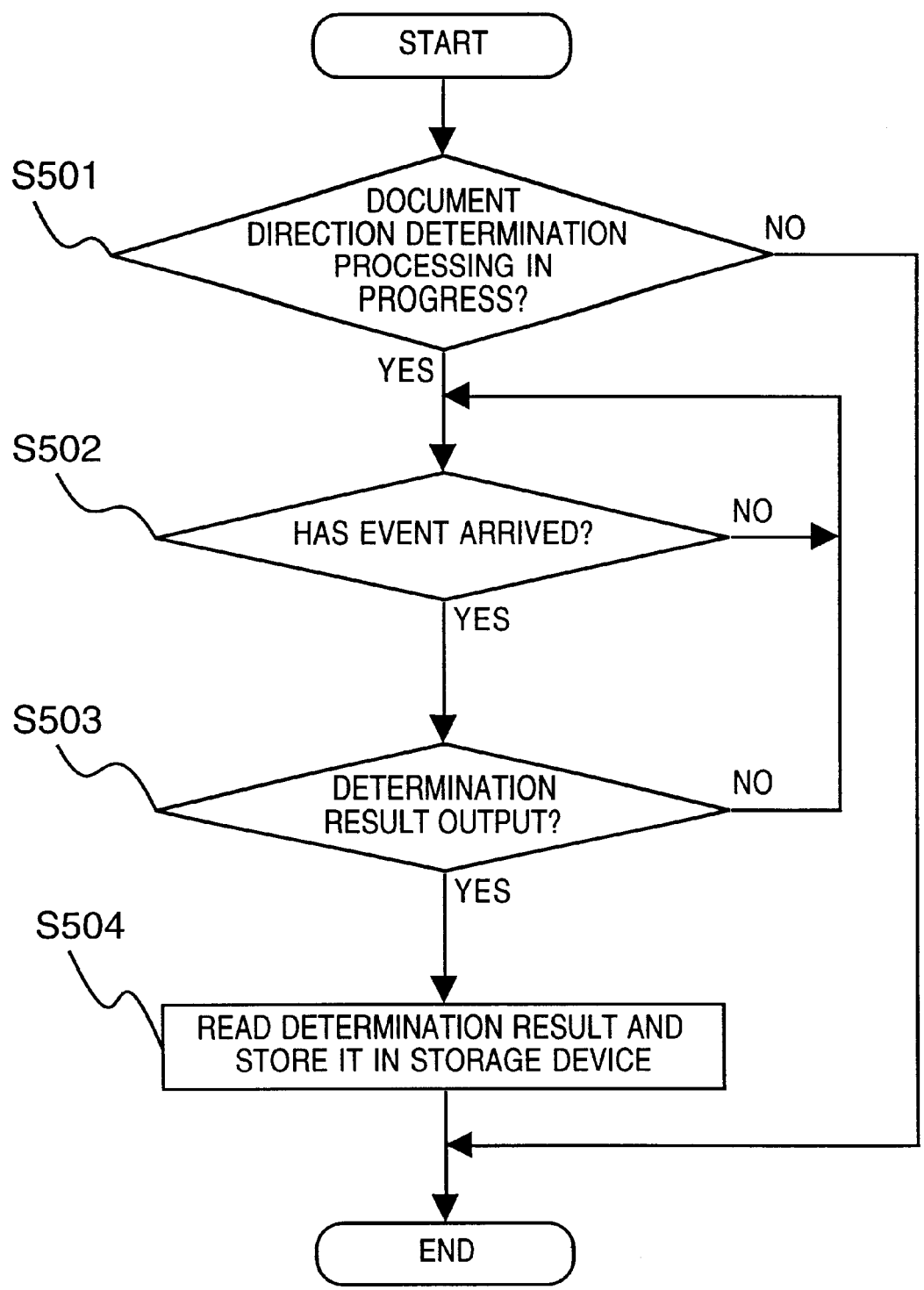
FIG. 5 is a flow chart showing an example of processing executed when the program shown in FIG. 1 is ended.

When all originals placed on the automatic document feeder section 1 are read, the program ends through steps S108 and S101. At this time, since the determination result of the final original may not be output, processing (end processing A: S110, S111, and S112) similar to processing in steps S105, S106, and S109 is preferably performed between step S101 and the end of program. Alternatively, when the program is ended, processing may wait for output of the document direction determination result of the final original to store the determination result in the storage device 205. This can be realized by ending the program shown in FIG. 1 without performing end processing A, and then executing processing shown in the flow chart of FIG. 5.

More specifically, an inquiry is made to the automatic document direction determination section 214 as to whether or not it is executing document direction determination processing (S501). If NO in step S501, the result has already been output and stored in the storage device 205 in step S103 in FIG. 1. Hence, the program ends. If YES in step S501, an event is waited for (S502). If a determination result output event occurs (S503), the result is stored in the storage device 205, and the program ends (S504).

In the program shown in FIG. 1, the event C occurs at the start of original reading operation. However, this event may be generated when reading operation of one original ends and reading operation of the next original starts. In this case, the program itself is executed after reading of the first original starts, and the document direction determination processing start instruction for the image data of the original is output.

Figure 6:
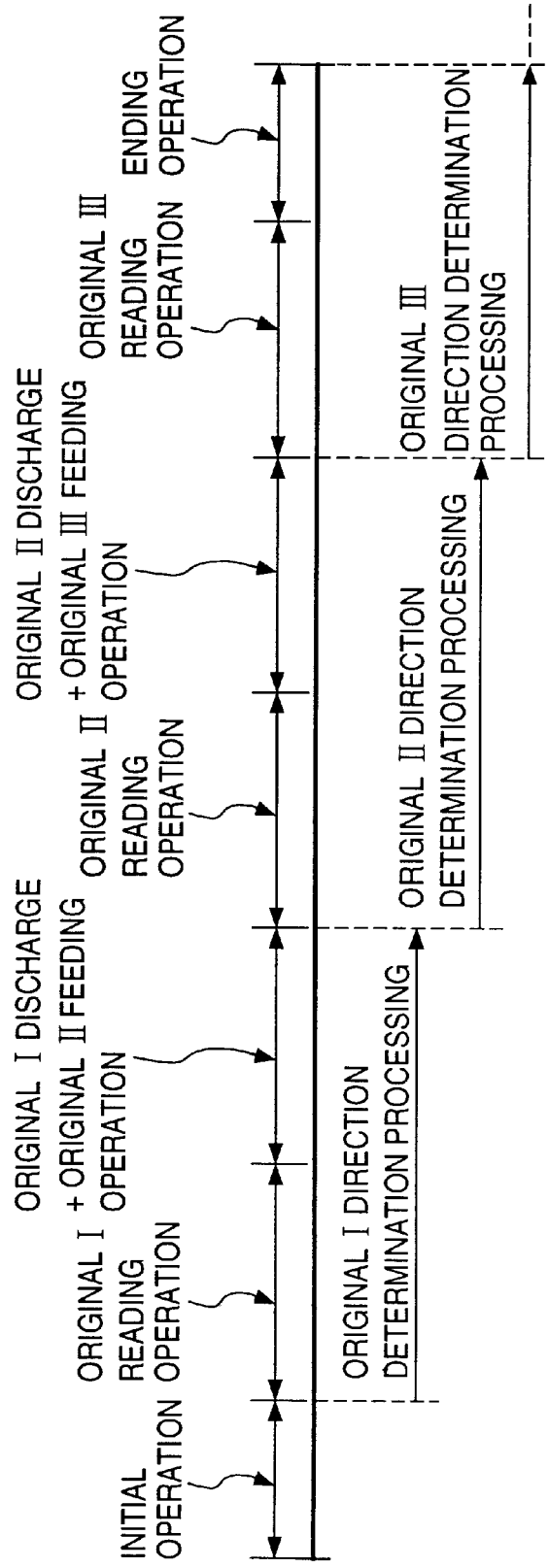
FIG. 6 is a timing chart showing the timing of original document direction determination processing in executing the program shown in FIG. 1.

FIG. 6 is a timing chart showing the timing of original document direction determination processing in executing the program shown in FIG. 1.

As shown in FIG. 6, after the initial operation ends, the original reading operation and original discharge/feeding operation are alternately repeated. Since, in FIG. 1, document direction determination processing is interrupted when reading of the next original starts, document direction determination processing for an original is performed between the start of reading an original and the start of reading the next original. Document direction determination processing for the final original (original III in FIG. 6) may be interrupted simultaneously with the end of read processing, as indicated by the solid line, or continued even after the end operation, as indicated by the broken arrow, by executing the program shown in FIG. 5.

<Document Direction Determination Processing>

Figure 7:
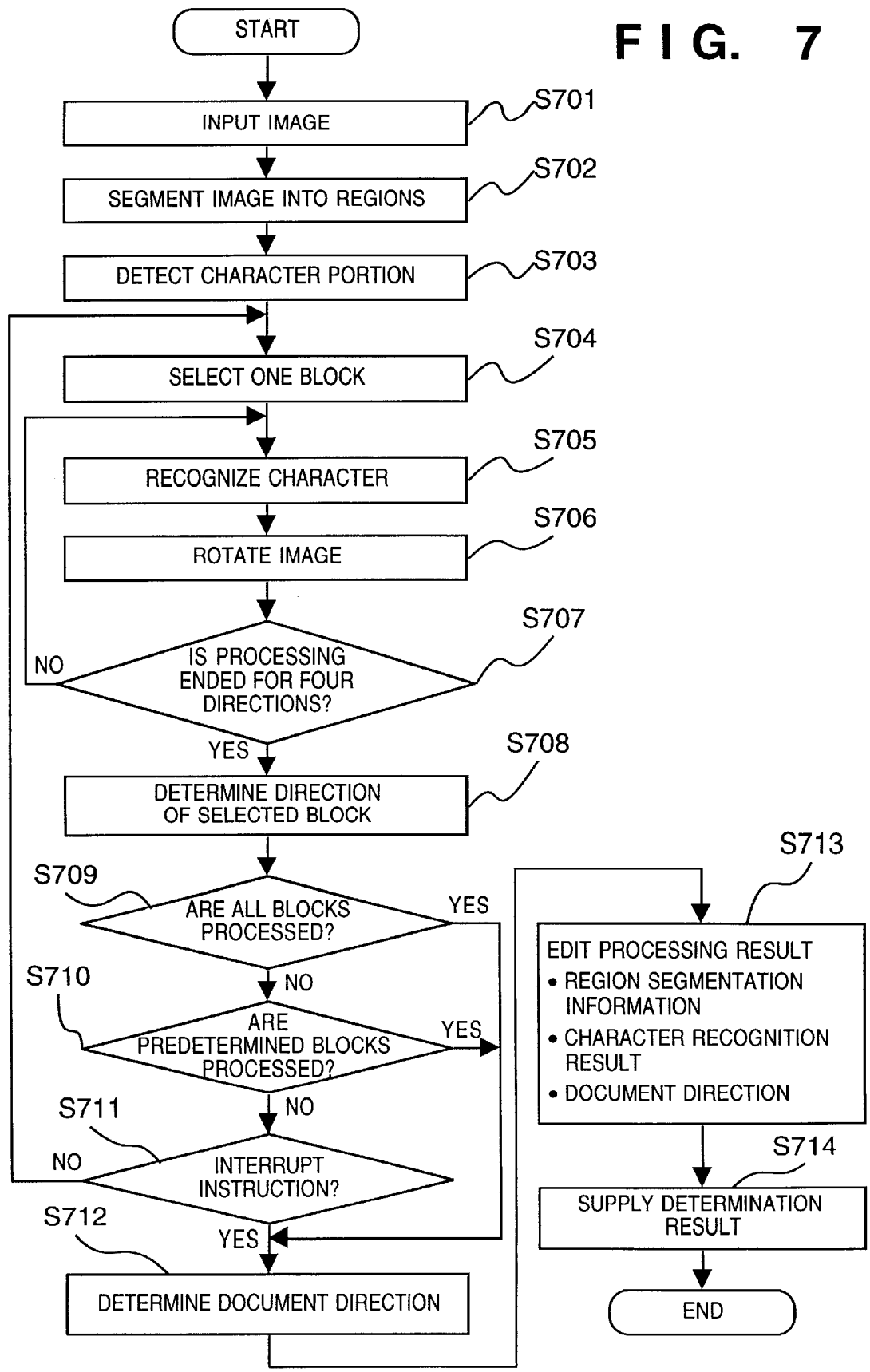
FIG. 7 is a flow chart showing details of document direction determination processing based on character recognition by an automatic document direction determination section 214 in the first embodiment of the present invention.

FIG. 7 is a flow chart showing details of document direction determination processing based on character recognition by the automatic document direction determination section 214 in the first embodiment.

When a document direction determination start instruction for a designated original is received from the image reading/control section 204, the original image data is input (S701). Next, an image represented by the input image data is segmented into rectangular regions by the region segmentation section 212 in accordance with types, such as a character portion, graphic portion, natural image portion, and table portion. An attribute (information representing an image type such as a character portion, graphic portion, natural image portion, or table portion) is added to each segmented region (S702). Actually, this processing is performed by generating the attribute information of each rectangular region.

The region segmentation section 212 breaks up the input image in the following manner. First, black pixels are detected by scanning the image. A rectangular region including the black pixels is generated using contour line tracking or labeling on the basis of continuity or discontinuity of black pixels. Next, it is determined whether the region is a character portion (title, text, or caption), graphic portion, natural image portion, or table portion, on the basis of the black pixel density in the rectangular region, the presence/absence of an adjacent rectangular region, and the aspect ratio of the rectangle. A rectangular region corresponding to a character region is determined from this determination result.

In step S703, the rectangular information of a region having attributes of a character portion is extracted on the basis of the added attributes. The character portion includes a text portion, title portion, characters in a table, and the caption of a figure.

Figure 8A:
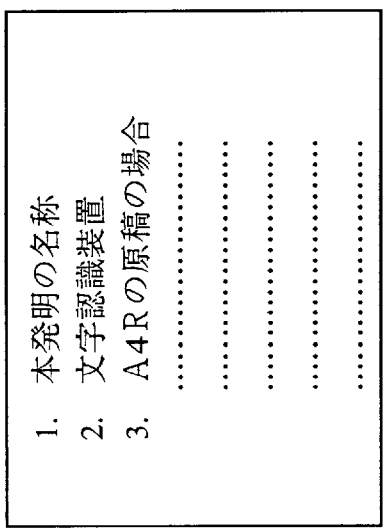
FIGS. 8A to 8D are views showing image originals that are placed on an original table glass 101 in various directions and read.
Figure 8B:
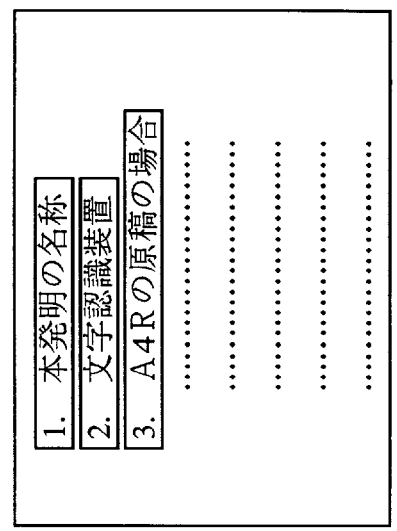
Figure 8C:
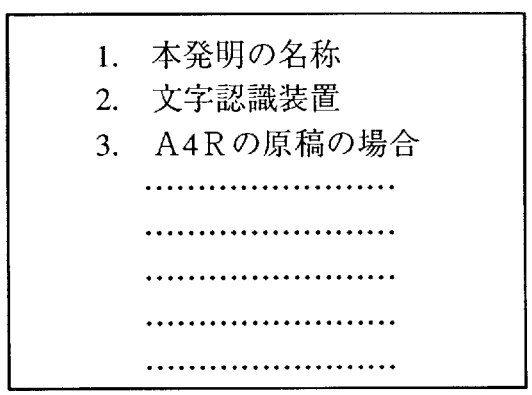
Figure 8D:
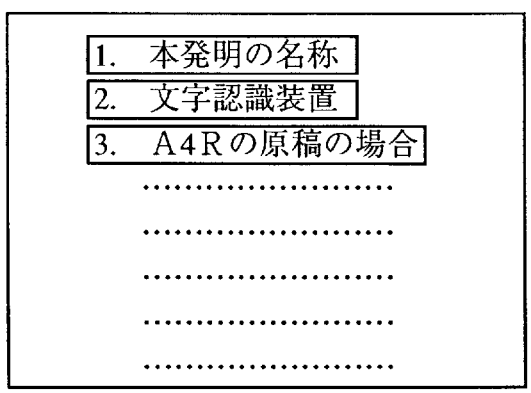

FIGS. 8A to 8D are views showing original images placed on the original table glass 101 in various directions and read. For example, rectangular information containing character portions as shown in FIGS. 8B and 8D are extracted from original images read in the directions shown in FIGS. 8A and 8C, respectively. One block is selected from the rectangular regions having the attribute of a character portion (S704), and character recognition processing is performed for the selected block (S705).

In this embodiment, feature vector extraction and comparison are used for character recognition processing. A description will be given below assuming that a rectangular region containing a character portion as shown in FIG. 8D is extracted.

FIGS. 9A to 9D are views showing steps of character recognition processing.

For example, a character region 71 containing a character "本" is determined, as shown in FIG. 9A. As the first step, character extraction processing is performed for the character region 71, as shown in FIG. 9B. In this processing, rectangles each containing one character are extracted by detecting the continuity of black pixels. As the second step, a pixel block containing one character and formed by m×n pixels (e.g., 64×64 pixels) is extracted, as shown in FIG. 9C. Black pixel distribution directions are extracted from the pixel block using a window formed from 3×3 pixels as shown in FIG. 9D. The extracted distribution direction is called direction vector information. FIG. 9D shows examples of direction vector information.

The window of 3×3 pixels is placed on the pixel block. Several tens pieces of direction vector information are obtained from the character contained in the pixel block by shifting the window in the vertical and horizontal directions. The pieces of vector information represent the feature of the character. The feature vectors are compared with the contents of a character recognition dictionary stored in advance. Characters are sequentially extracted in. descending order of closeness to the feature vectors. In this case, the first candidate, second candidate, . . . are extracted in descending order of similarity to the feature vectors. The closeness of the feature to the feature vectors represents the distance from the character, i.e., a numerical value quantifying the confidence coefficient of character recognition.

In this way, the confidence coefficient of character recognition for each character is obtained.

The flow advances to step S706. The rectangular region containing the character portion is rotated clockwise through 90° on the basis of a known technique, and region segmentation information is corrected in accordance with the rotated image. With this processing, a change in region segmentation information due to image rotation is corrected by address conversion of the region segmentation result.

In step S707, it is checked whether or not character recognition processing has been performed in four directions by rotating the image clockwise through 90°, 180°, and 270° from the first character recognition position of 0°. If NO in step S707, the flow returns to step S705 to perform character recognition processing for the rotated image. If YES in step S707, the flow advances to step S708 to determine the document direction of the selected block on the basis of the confidence coefficient obtained by character recognition processing.

Figures 10A, 10B, 10C:
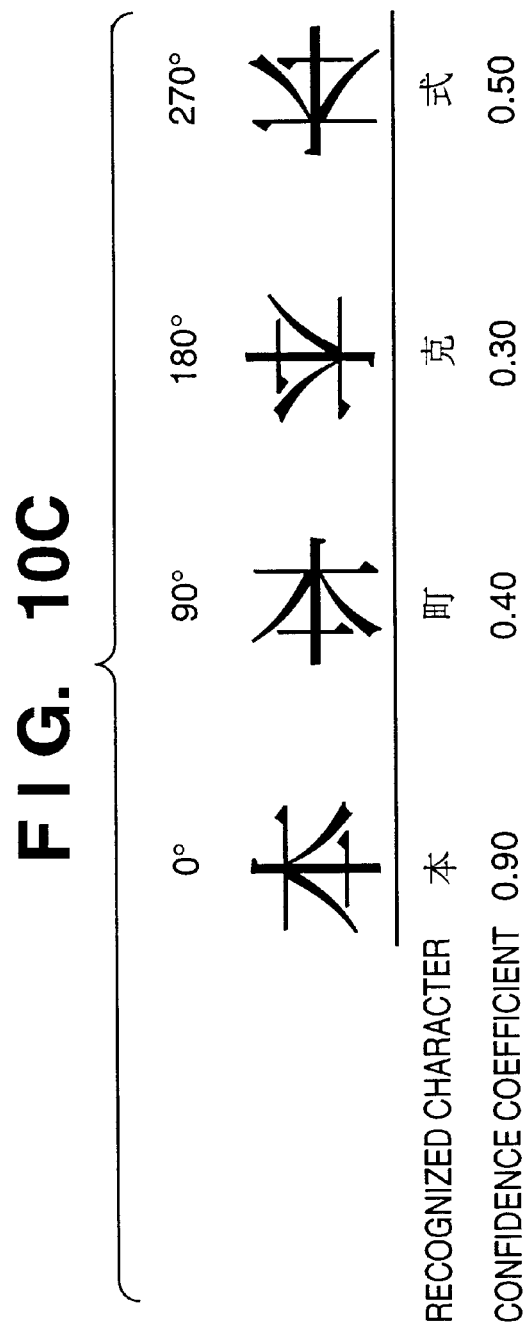
FIGS. 10A to 10C are views for explaining character direction determination processing.

FIGS. 10A to 10C are views for explaining character direction determination processing. A description will be made below using the example "本発明の名称" in the rectangular region 71 shown in FIG. 9A.

FIGS. 10A shows a character string in character recognition for the first time. FIG. 10B shows a character string obtained by rotating the character string shown in FIG. 10A clockwise through 270°. The character "本" is picked up from this character string. To determine the character direction, the results of character recognition executed from four directions of 0°, 90°, 180°, and 270° for one character "本" are examined. The character recognition results in these directions are different from each other, as shown in FIG. 10C. The character recognition results or confidence coefficients shown in FIG. 10C are merely examples for the description and may change in fact.

As shown in FIG. 10C, when the character is recognized from the direction of 0°, the recognized character is "本" and the confidence coefficient is as high as "0.90". When the character is recognized by rotating the character string through 90°, the recognized character is "町", and the confidence coefficient lowers to "0.40". The reason why such recognition error occurs, and the confidence coefficient drops is that character recognition is performed on the basis of feature vectors obtained from the rotated character string. When the character is recognized by rotating the character string through 180° and 270°, the recognized characters are "克" and "式", respectively, and the confidence coefficient lowers to "0.30" and "0.50", respectively. A recognition error occurs, and the confidence coefficient lowers. In such character recognition processing, as the character complexity increases, the confidence coefficient largely changes depending on the direction.

As is apparent from the results shown in FIG. 10C, since the confidence coefficient obtained from the first character recognition result is the highest, it is determined that the read image is set in a direction shown in FIG. 10A with a high probability.

When the document direction of the block is determined using a plurality of characters in the block instead of determining the document direction on the basis of the confidence coefficient of only one character, the document direction can be more accurately determined. Alternatively, a threshold value is set for the confidence coefficient. When the confidence coefficient exceeds a certain threshold value (e.g., 0.9), character recognition process for the remaining directions may be omitted even before character recognition from all directions ends.

After the document direction of the selected block is determined, it is checked whether or not the input image still contains a character portion whose document direction has not been determined (S709). If directions of all blocks in the input image have been determined, the flow advances to step S712 to determine the document direction synthetically on the basis of the document direction data of selected blocks at that time point. The region segmentation information and information associated with the determined document direction and character recognition results are edited as a processing result (S713).

When the input image still contains a character portion whose document direction has not been determined, the flow advances to step S710 to check whether or not document direction determination has been completed for a predetermined number of blocks. If YES in step S710, the document direction of the input image is determined on the basis of the predetermined number of blocks whose document directions have been determined (S712), and the processing result is edited (S713).

When a character portion without document direction determination still remains, and document direction determination processing for a predetermined number of blocks is not over, it is checked whether or not an interrupt instruction is transmitted from the image reading/control section 204 (S711). If NO in step S711, the flow returns to step S704 to select the next block, and the document direction of the block is determined. If YES in step S711, the flow advances to step S712 to determine the document direction of the input image using the document direction determination results of blocks at that time point. Then in step S713, the processing result is edited. Simultaneously, the image reading/control section 204 is notified of the determination result (S714), and processing ends.

The document direction determination results of a plurality of blocks may be examined in combination by the following method. Character recognition is performed for each block. The average value of the confidence coefficients in the four directions of each character is calculated. The average values of the confidence coefficients in each block are averaged for each of the four directions. A direction with the largest average value is determined as the document direction.

FIGS. 11A to 11C are views showing edit data obtained by the above-described document direction determination processing.

FIG. 11A shows original image data. FIG. 11B shows region segmentation data. FIG. 11C shows character recognition information.

As shown in FIG. 11B, region segmentation data has "header" indicating that this data is region segmentation data and "rect1" to "rectn4" as the identifiers of segmented regions. Each region (block) discriminated by an identifier comprises "order" as the block number, "art" as the block attribute (e.g., character or graphic portion), "x1" and "y1" as the coordinate values at the upper left corner of the block, "w" as the block width, "h" as the block height, "direction" representing a vertical or horizontal character direction, "self ID" as the ID of the block, "upper ID" as the ID of a parent block containing the block, "upper Art" as the attribute of the parent block, and "reserve" representing a reserved region.

As shown in FIG. 11C, character recognition information has "header" representing that the data is character recognition information, and combined information such as "OCR1" as character recognition information associated with a single character such as "本" and "blk header" corresponding to "rect" representing a block containing the character.

Each character recognition information "OCR1", "OCR2", . . . , "OCRn" comprises "type" indicating that the portion has a character or a space, "character 1" to "character 5" as the first to fifth candidate characters according to the confidence coefficient obtained from a character recognition result, "x1" and "y1" representing the character extraction position, "w" as the character width, "h" as the character height, and "reserve" representing a reserved region.

This processing result may be transmitted to another computer through the interface (I/F) section 206 and used by, e.g., filing application software on the computer.

In the first embodiment, original direction determination processing is interrupted simultaneously with the start of reading operation of the next original. Hence, document direction determination processing does not delay the original reading operation, and document direction information can be obtained together with the original image while maintaining high productivity.

[Second Embodiment]

Figure 12:
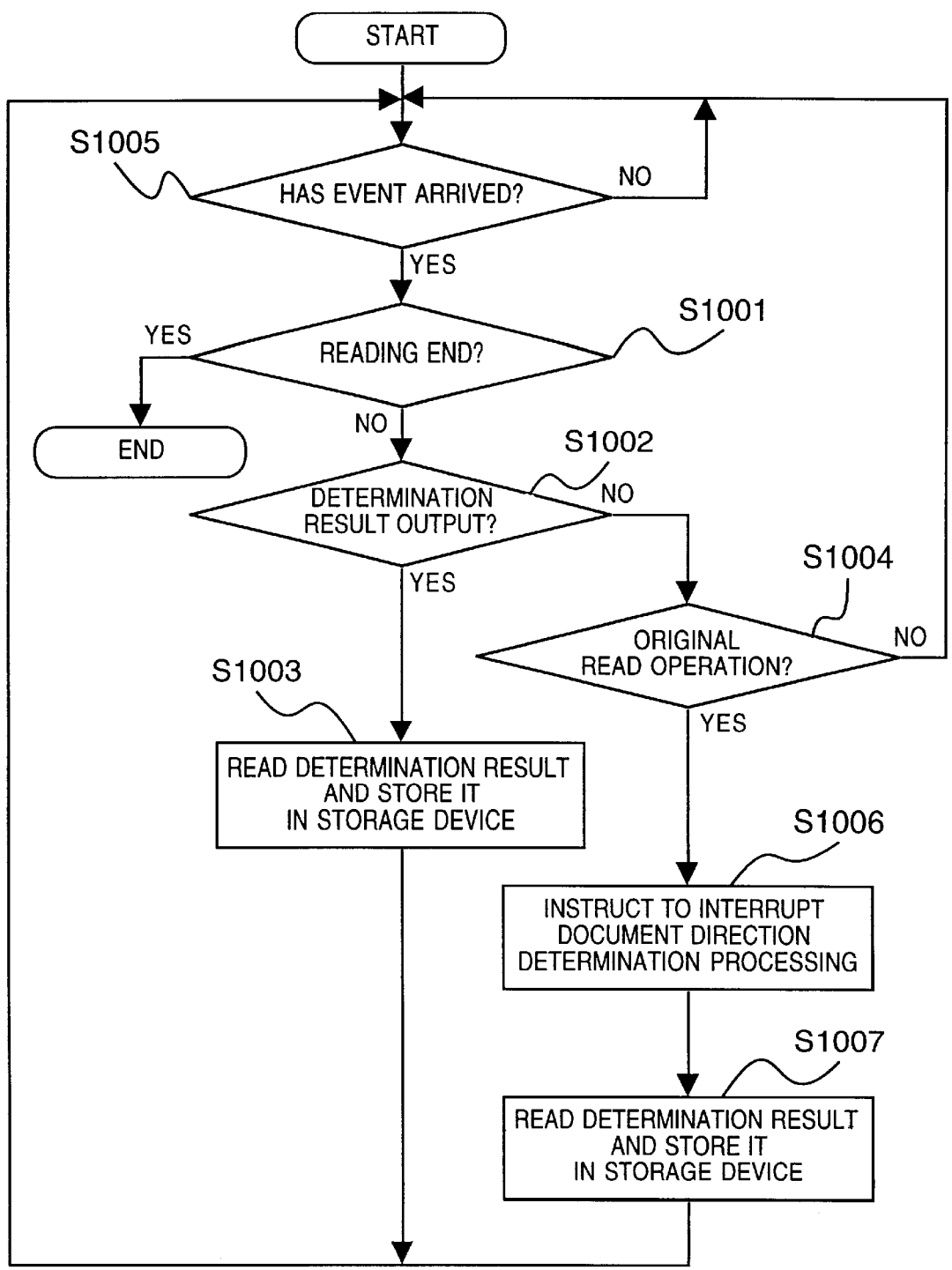
FIG. 12 is a flow chart showing the flow of event monitoring processing by an image reading/control section 204 in the second embodiment of the present invention.
Figure 13:
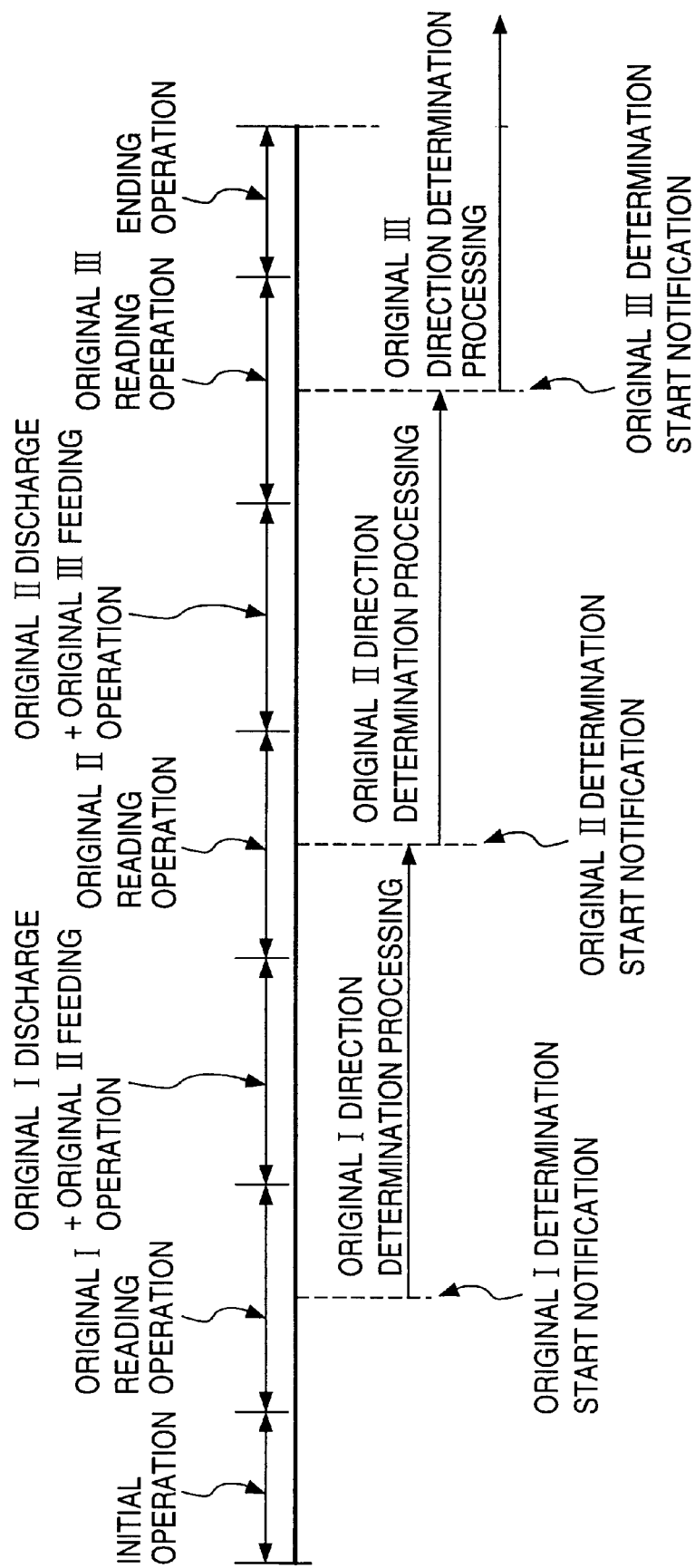
FIG. 13 is a timing chart showing the timing of original document direction determination processing in executing the program shown in FIG. 12.
Figure 14:
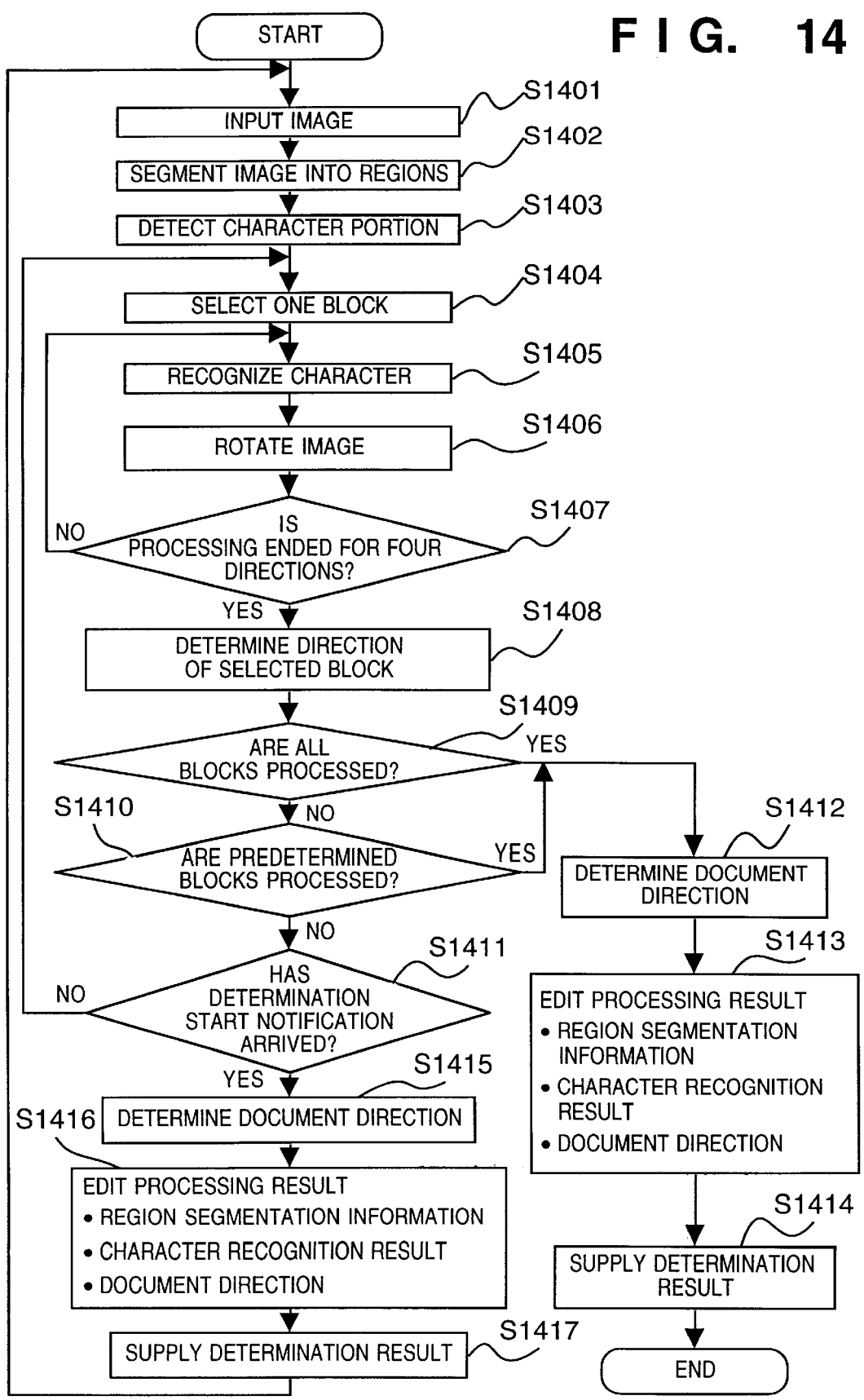
FIG. 14 is a flow chart showing details of document direction determination processing based on character recognition by an automatic document direction determination section 214 in the second embodiment of the present invention.

FIGS. 12 to 14 show flow and timing charts for explaining an image processing system according to the second embodiment of the present invention.

In the second embodiment, original image data subjected to document direction determination processing is switched at a different timing by different processing from those in the first embodiment. The hardware arrangement and general function of an image processing system 100 are the same as those described in the first embodiment with reference to FIGS. 2 to 4, and a detailed description thereof will be omitted. The same reference numerals as in the first embodiment denote the same parts in the second embodiment.

<Reading Operation of System>

FIG. 12 is a flow chart showing the flow of event monitoring processing by an image reading/control section 204. Control shown in this flow chart partially constructs a program stored in a program storage ROM 201 shown in FIG. 2 and best illustrates the characteristic feature of the second embodiment, as in the flow chart shown FIG. 1 in the first embodiment. The program of this flow chart is executed simultaneously with the start of read processing (S402 in FIG. 4) for the first original and output of an instruction to start document direction determination processing for the first original image data. First, in step S1006, events from a scanner section 202 (automatic document feeder section 1) and an automatic document direction determination section 214 are waited for.

The following three events are waited for in this program.

Event A. End of read processing for all originals in the scanner section 202

Event B. Output of a document direction determination result from the automatic document direction determination section 214

Event C. Start of original reading operation by the scanner section 202

The generation timings of the events A and B are the same as in the first embodiment. More specifically, the events A and B occur respectively when a bundle of originals comprised of a plurality of sheet materials set in the scanner section 202 are completely read (S408 in FIG. 4) and when document direction determination processing by the automatic document direction determination section 214 ends and a determination result is output. However, the event C occurs when the scanner section 202 ends reading operation of one original and starts reading operation of the next original. The start of reading operation herein means the start of output of image data from the scanner section 202. Alternatively, the start of scanning by a scanner unit 4 shown in FIG. 3 may be detected.

Referring to FIG. 12, processing in steps S1001 to S1005 corresponds to steps S101 to S104 and S108 in the first embodiment, and the same processing as in the first embodiment is performed. In the second embodiment, however, when an original reading start event occurs, the flow advances to step S1006 to instruct the automatic document direction determination section 214 not to interrupt processing but to start document direction determination processing for the next original. This document direction determination processing start instruction is outputted not independently of image read processing but on the basis of image read processing. For example, the instruction may be outputted when a predetermined amount of image on the original is read or at a predetermined interval calculated from the time required for read processing of one original.

If document direction determination processing has already ended before reception of the instruction, the automatic document direction determination section 214 receives the next original image data and starts document direction determination processing. During document direction determination processing, the automatic document direction determination section 214 outputs the document direction determination result at that time point and receives the next original image data. Processing by the automatic document direction determination section will be described later in detail.

As described above, when a document direction determination processing start instruction is output in step S1006, the determination result is output from the automatic document direction determination section 214. The determination result is read and stored in a storage device 205. The flow returns to step S1005 to wait for the next event.

More specifically, when the copy key is depressed, and this program is executed, document direction determination processing for the first original image data starts. When document direction determination processing for the first original ends before the start of reading the second original, the flow advances from step S1005 to step S1003 through the steps S1001 and S1002. The determination result is read and stored in the storage device 205 in association with the first original image data.

When reading of the second original starts before the document direction determination result for the first original is output, the flow advances from step S1005 to step S1006 through steps S1001, S1002, and S1004 to instruct the automatic document direction determination section 214 to start document direction determination processing. Upon receiving this start instruction, the automatic document direction determination section 214 outputs the determination processing result. The determination result of the first original is read and stored in the storage device 205 in association with the original image data (S1007), and the next event is waited for (S1005).

When all originals stacked on the automatic document feeder section 1 are read, the flow advances from step S1005 to step S1001 to end the program. At this time, the determination result of the final original may not have been output. Hence, when the program ends, processing may wait for output of the document direction determination result of the final original to store the determination result in the storage device 205. This can be realized by executing processing shown in the flow chart of FIG. 5 simultaneously with the end of the program shown in FIG. 12.

In step S1006 in FIG. 12, the document direction determination processing start instruction is sent to the automatic document direction determination section 214. However, read image data itself may be used as this instruction.

FIG. 13 is a timing chart showing the timing of original document direction determination processing in executing the program shown in FIG. 12.

As shown in FIG. 13, after the initial operation ends, the original reading operation and original discharge/feeding operation are alternately repeated. In FIG. 6 of the first embodiment, document direction determination processing for an original is performed between the start of reading the original and the start of the next reading operation. In the second embodiment, however, document direction determination processing starts upon receiving a document direction determination start notification. Hence, as shown in FIG. 13, even when control is performed to start document direction determination processing for an original at the time point of reading ½ of the image of the original by the scanner section 202, document direction determination processing can be performed until the start of document direction determination processing for the next original. For this reason, the document direction can be determined as accurately as possible without lowering the productivity.

<Document Direction Determination Processing>

FIG. 14 is a flow chart showing details of document direction determination processing based on character recognition by the automatic document direction determination section 214 in the second embodiment.

In this flow chart, processing in steps S1401 to S1410 and processing in S1412 to S1414 correspond to processing in step S701 to S710 and processing in steps S712 to S714 in FIG. 7 described in the first embodiment, respectively. The same processing as in the first embodiment is performed, and a detailed description thereof will be omitted.

In step S1408, the document direction of a selected block is determined. If an unprocessed character portion remains, and a predetermined number of blocks have not been processed yet, the flow advances to step S1411. In step S1411, it is checked whether or not the document direction determination start notification for the next original has arrived from the image reading/control section 204. If NO in step S1411, the flow returns to step S1404 to select the next block, and document direction determination processing is performed. If YES in step S1411, the document direction of the input image is determined for a combination of selected blocks whose document directions are determined (S1415). Next, the region segmentation information and information associated with the determined document direction and character recognition results are edited as a processing result (S1416). Simultaneously, the determination result is supplied to the image reading/control section 204 (S1417). The flow returns to step S1401 to input the next original image data. In step S1411, arrival of a document direction determination start notification is checked. Instead, input of the next original image data itself may be checked. In this case, if image data is input, the flow advances to step S1415. If no image data is input, the flow returns to step S1404.

When the automatic document direction determination section 214 is controlled in accordance with this flow chart, the program need not end and started every time one original image data is input, and the processing efficiency increases further.

[Third Embodiment]

FIGS. 15 to 18 are views and flow charts for explaining an image processing system according to the third embodiment of the present invention.

In the first and second embodiments, image processing systems for document direction determination processing with priority on productivity have been described. The image processing system of the third embodiment can switch between a document direction determination processing mode with priority on productivity and a document direction determination processing mode with priority on determination accuracy. The hardware arrangement and general function of an image processing system 100 are the same as those described in the first embodiment with reference to FIGS. 2 to 4, and a detailed description thereof will be omitted. The same reference numerals as in the first embodiment denote the same parts in the third embodiment.

<Reading Operation of System>

Figure 15:
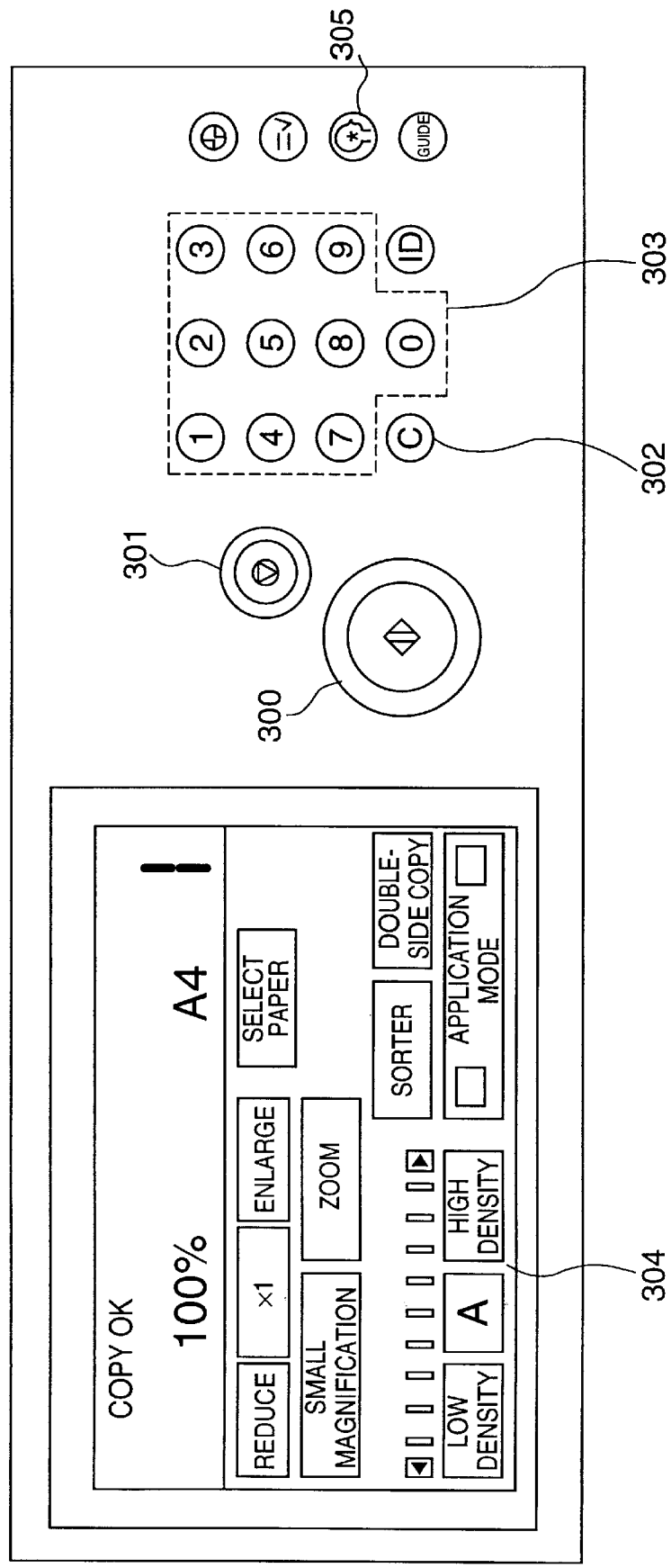
FIG. 15 is a view showing the outer appearance of the user interface of an operation display unit 209 of the third embodiment of the present invention.

FIG. 15 is a view showing the outer appearance of the user interface of an operation display unit 209 shown in FIG. 2.

Referring to FIG. 15, a start key 300 is used to start the original read and image forming operations. A stop key 301 is used to interrupt the original read and image forming operations. A ten-key pad 303 is used to designate the number of copies of a read original. A clear key 302 is used to clear the numerical value designated by the ten-key pad 303. A liquid crystal display (LCD) 304 has functions of displaying the state of the apparatus and setting various modes of the apparatus. The LCD 304 has a transparent touch panel which is used to set various modes in combination with display on the LCD 304. A user mode key 305 is used to set the specifications or state of the machine. In this embodiment, the user mode key is depressed to display a mode switching window shown in FIG. 16 on the LCD 304.

Figure 16:
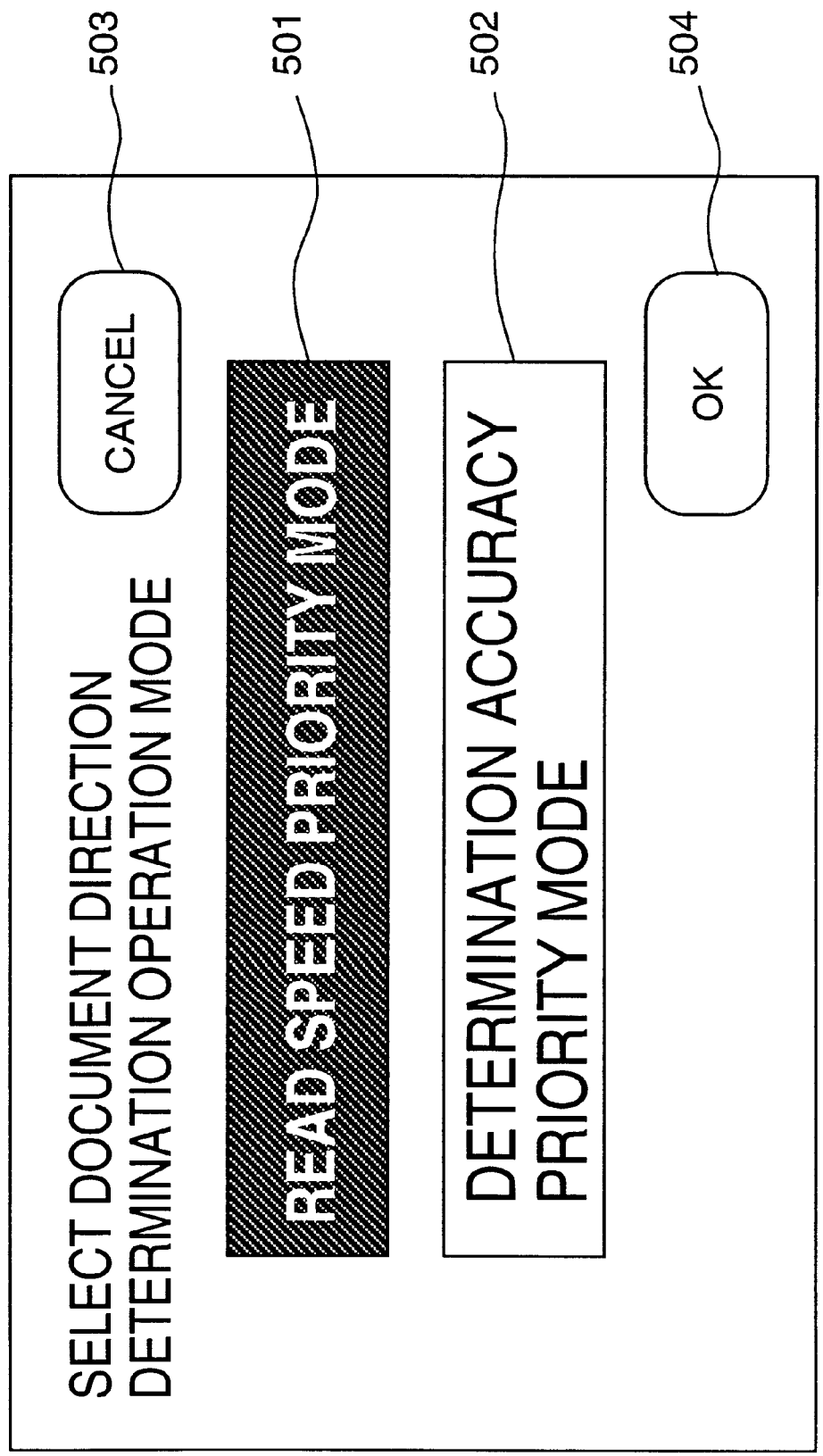
FIG. 16 is a view showing a window displayed on an LCD 304 when a user mode key 305 shown in FIG. 15 is depressed.

FIG. 16 shows an example of a window displayed on the LCD 304 when the user mode key 305 shown in FIG. 15 is depressed.

Keys 501 to 504 operate in synchronism with the touch panel on the LCD 304. When the "read speed priority mode" key 501 is depressed to select this mode, the image processing system operates as in the above-described first or second embodiment. When the "determination accuracy priority mode" key 502 is depressed to select this mode, document direction determination processing for the next original is started after determination processing by an automatic document direction determination section 214 is completely ended. The OK key 504 is depressed to determine selection of the key 501 or 502. The cancel key 503 is depressed to cancel selection.

Figure 17:
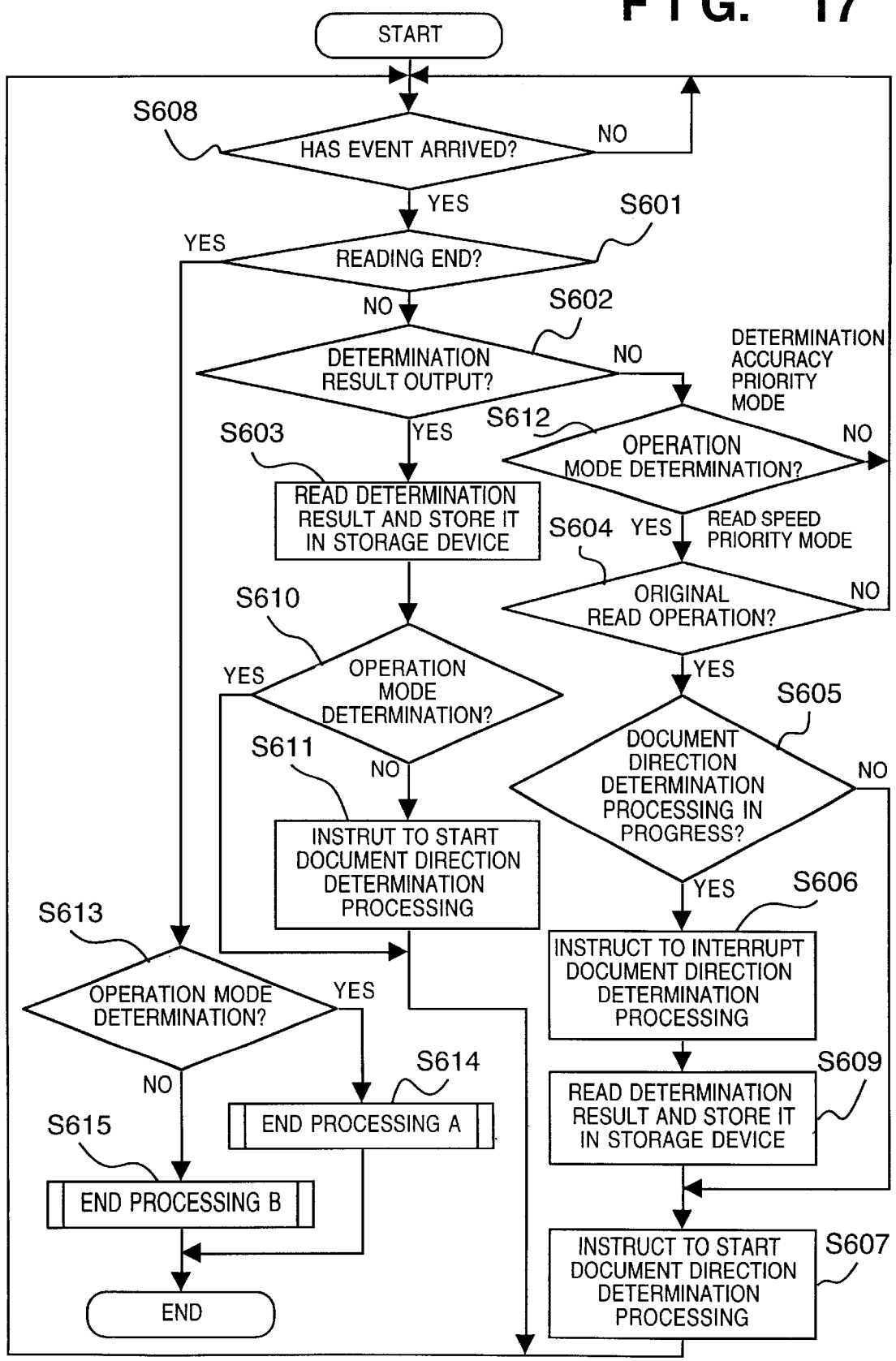
FIG. 17 is a flow chart showing the flow of event monitoring processing by an image reading/control section 204 in the third embodiment of the present invention.

FIG. 17 is a flow chart showing the flow of event monitoring processing by an image reading/control section 204. Control shown in this flow chart partially constructs a program stored in a program storage ROM 201 shown in FIG. 2 and best illustrates the characteristic feature of the third embodiment, as in the flow chart shown FIG. 1 in the first embodiment.

Processes in the flow chart of FIG. 17 are almost the same as those in the flow chart of FIG. 1. Steps S601 to S609 correspond to steps S101 to S109, respectively, and the same processing as in the first embodiment is performed. As in the second embodiment, the program of this flow chart is executed simultaneously with the start of read processing (S402 in FIG. 4) for the first original and output of an instruction to start document direction determination processing for the first original image data. The event waited for in step S604 also occurs when a scanner section 202 completes the reading operation for one original and starts the reading operation for the next original.

Operation mode determination processing in steps S610, S612, and S613 is inserted into the program of this embodiment. When a determination processing result reveals that the operation mode of the automatic document direction determination section 214 is the read speed priority mode, this program performs completely the same processing as in FIG. 1. Only a case wherein the determination accuracy priority mode is set as the operation mode will be described below.

When the arrived event is neither a reading end event nor a determination result output event, the operation mode of the automatic document direction determination section 214 is determined in step S612. When the operation mode is the determination accuracy priority mode, the flow returns to step S608 to wait for the next event. That is, the determination accuracy priority mode does not wait for the original reading operation start event.

When the determination result output event arrives, the flow advances from step S602 to step S603 to read the determination result and store it in a storage device 205. After this, if it is determined in step S610 that the accuracy priority mode is set as the operation mode, the start of document direction determination processing for the next original is instructed in step S611. If the next original is not present, this instruction is invalidated.

When a reading end event has arrived, the flow advances from step S608 to step S613 through step S601. In the speed priority mode, the flow advances to step S614 to perform the same end processing A (FIG. 1) as in the first embodiment. However, in the accuracy priority mode, the flow advances to step S615 to perform end processing B.

Figure 18:
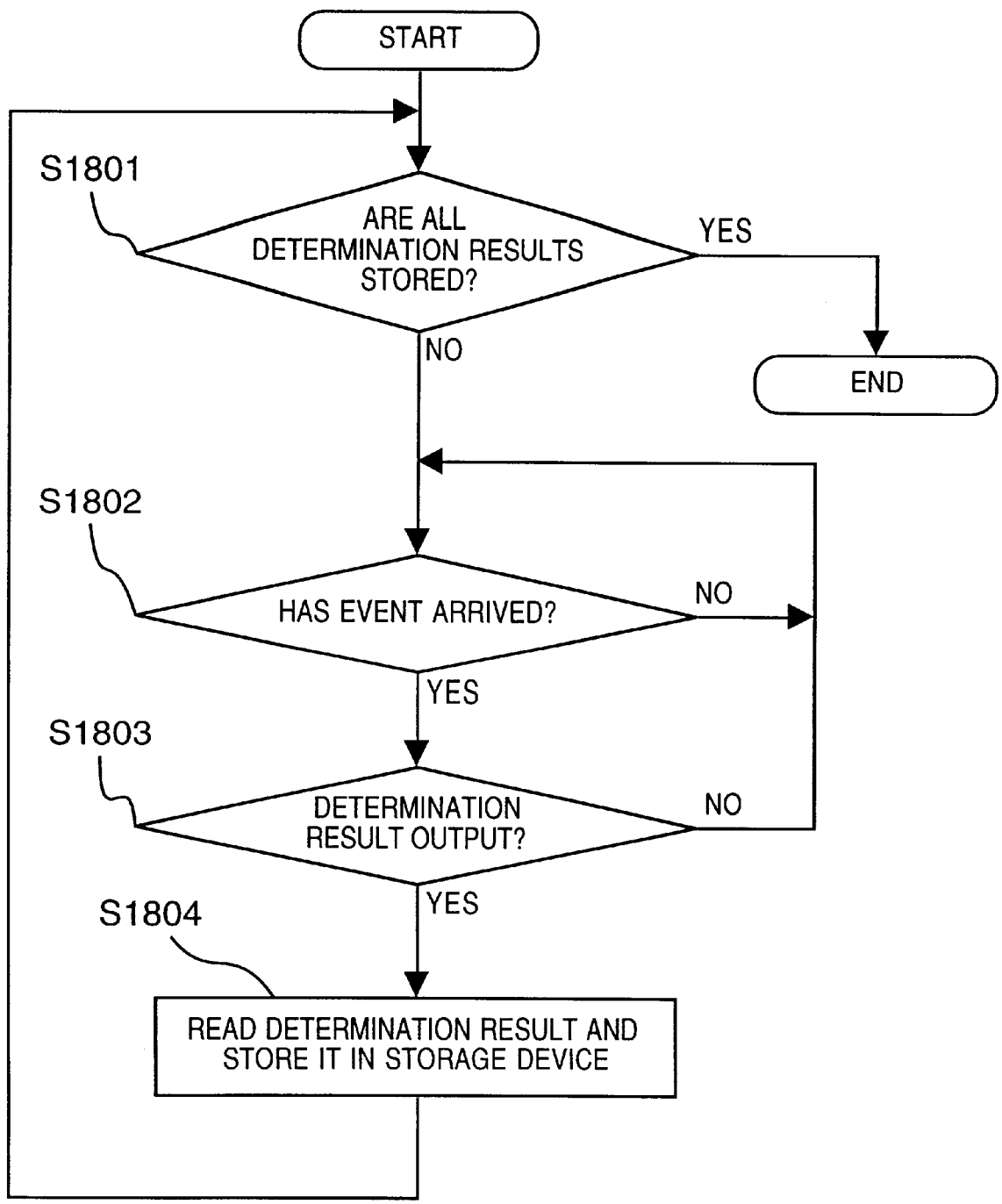
FIG. 18 is a flow chart showing the processing contents of the subroutine "end processing B" in FIG. 17.

In consideration of a case wherein the image reading/control section 204 completes read processing for all originals although document direction determination processing by the automatic document direction determination section 214 is not finished for a preceding original, end processing B is performed in accordance with the flow chart shown in FIG. 18.

FIG. 18 is a flow chart showing the processing contents of the subroutine "end processing B" in FIG. 17.

First, in step S1801, it is checked whether or not the determination results of all originals are read and stored in the storage device 205. If YES in step S1801, the program ends. If an original whose determination result has not been received yet remains, the flow advances to step S1802 to wait for an event. Processing waits until a determination result output event arrives in step S1803. If a determination result output event arrives, the flow advances to step S1804 to read the determination result and store it in the storage device 205. The flow returns to step S1801 to check whether or not determination results of all originals are read. That is, even after the original reading operation by the image reading/control section 204 is ended, the program in FIG. 17 continuously runs until document direction determination processing for all originals ends.

Since the operation mode can be switched between the read speed priority mode and determination accuracy priority mode, original reading corresponding to the user's need can be performed. In the third embodiment, the same processing as in the first embodiment is performed in the read speed priority mode. However, the same processing as in the second embodiment may be performed. In the determination accuracy priority mode, after determination processing by the automatic document direction determination section 214 is completely ended, document direction determination processing for the next original is started. However, after determination processing by the automatic document direction determination section 214 is completely over, reading of the next original may be started.

(Other Embodiments)

In the first to third embodiments, processing that ends at storage of document direction determination results in the storage device 205 has been described. However, the determination results can be used for various purposes. For example, when a plurality of read images are to be printed on one sheet, the determination results may be used to match the image directions. When a plurality of originals with different directions are to be copied, the determination results may be used to output images in the same document direction onto the discharge tray. Input image data may be rotated on the basis of the determination results and then stored in the storage device. Alternatively, when a plurality of original images are to be read and displayed on the display, the determination results may be used to automatically display the documents in the same direction.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, the storage medium is read by the storage device 205 shown in FIG. 2. Program codes corresponding to the above-described flow charts are stored in this storage medium. This will be briefly described. At least a program module of the detection step of detecting input of an image whose image direction is to be determined by an image direction determination means, and a program module of the instruction step of instructing the image direction determination means to output an image direction determination result at a predetermined timing in response to image input detected in the detection step are stored in the storage medium.

As has been described above, according to the present invention, an image processing apparatus capable of determining the document direction while maintaining high productivity can be provided. In addition, a convenient image processing apparatus capable of switching between reading with priority on document direction determination accuracy and reading with priority on productivity can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

image input means for inputting image data;

image direction determination means for determining an image direction of the image data input by said image input means; and control means for controlling output timing of an image direction determination result of the image data, in accordance with inputting of new image data which is input after the image data input by said image input means.

2. The apparatus according to claim 1, wherein said image input means has image read means for reading an image on an original, and said control means controls said image direction determination means to output the image direction determination result at a predetermined timing based on operation of said image read means.

3. The apparatus according to claim 2, wherein when reading of a second original is started by said image read means during image direction determination processing for image data of a first original, said control means interrupts image direction determination processing for the image data of the first original and controls said image direction determination means to output the image direction determination result at that time point.

4. The apparatus according to claim 1, wherein said image direction determination means comprises:
    a character recognition dictionary in which features of characters are described; and
    document direction determination means for recognizing each character of character data contained in the image data input by said image input means using said character recognition dictionary, determining directions of individual characters on the basis of character recognition results, determining a document direction on the basis of the directions of all individual characters, and outputting the document direction.

5. The apparatus according to claim 1, further comprising:

mode switching means capable of switching between
    a first mode in which said image direction determination means is not controlled by said control means, and image data is input from said image input means after image direction determination processing by said image direction determination means is ended, and
    a second mode in which said image direction determination means is controlled by said control means.

6. The apparatus according to claim 1, wherein said apparatus further comprises instruction means for instructing said image direction determination means to start determination processing, and when said instruction means instructs to start determination processing for image data of a second original during image direction determination processing for image data of a first original, said control means controls said image direction determination means to output an image direction determination result of the first original at that time point and start image direction determination processing for the image data of the second original.

7. An image processing apparatus comprising:

image input means for inputting image data;

image direction determination means for determining an image direction of the image data input by said image input means; and control means for, when input of second image data is started by said image input means during image direction determination processing for first image data input by said image input means, controlling output timing of an image direction determination result of the first image data in accordance with the inputting of the second image data which is input after the first image data input by said image input means.

8. The apparatus according to claim 7, wherein said image direction determination means comprises:
    a character recognition dictionary in which features of characters are described, and
    document direction determination means for recognizing each character of character data contained in the image data input by said image input means using said character recognition dictionary, determining directions of individual characters on the basis of character recognition results, determining a document direction on the basis of the directions of all individual characters, and outputting the document direction.

9. The apparatus according to claim 7, further comprising:

mode switching means capable of switching between
    a first mode in which said image direction determination means is not controlled by said control means, and image data is input from said image input means after image direction determination processing by said image direction determination means is ended, and
    a second mode in which said image direction determination means is controlled by said control means.

10. The apparatus according to claim 7, wherein said apparatus further comprises instruction means for instructing said image direction determination means to start determination processing, and when said instruction means instructs to start determination processing for image data of a second original during image direction determination processing for image data of a first original, said control means controls said image direction determination means to output an image direction determination result of the first original at that time point and start image direction determination processing for the image data of the second original.

11. An image processing method comprising:

the image input step of continuously inputting a plurality of images;

the image direction determination processing step of determining an image direction of a first image input in the image input step;

the interrupt step of interrupting the image direction determination processing step in accordance with an input timing of a second image in the image input step; and the determination result output step of outputting image directions of the first image determined until the interrupt, in accordance with input timing of the second image input in the image input step.

12. A computer-readable memory comprising:

a program module of the image direction determination processing step of determining an image direction of an image;

a program module of the timing of an interrupt step of interrupting the image direction determination processing step in accordance with inputting of a new image; and a program module of the determination result output step of outputting image directions determined until the interrupt, in accordance with input timing of the new image.

13. A computer-readable memory which stores control program modules for controlling output timing of determining an image direction of image data, comprising:

a program module of the detection step of detecting input of an image whose image direction is to be determined by said image direction determination means; and a program module of the instruction step of instructing said image direction determination means to output an image direction determination result in accordance with inputting new image data which is input after the image data.

14. A method for controlling an image processing apparatus, which has image input means for inputting image data, and image direction determination means for determining an image direction of an image data input by said image input means, said method comprising:

control step of controlling output of an image direction determination result by said image direction determination means, wherein in said control step, output timing of an image direction determination result of the image data is controlled based on inputting of new image data which is input after the image data by said image input means.

15. A computer-readable memory storing program for causing an image processing apparatus, which has image input means for inputting image data, and image direction determination means for determining an image direction of an image data input by said image input means, to perform a control step of controlling said image direction determination result of the image data at a timing based on inputting of new image data which is input after the image data input by said input means.

16. An image processing apparatus comprising:

image input means for inputting image data;

image direction determination means for determining an image direction of the image data input by said image input means;

detection means for detecting a completion of image direction determination of the image data by said image direction determination; and control means for controlling said image direction determination means to output an image direction determination result of the image data in accordance with detecting of the completion of the image direction determination on the image data by said detection means, wherein said control means controls said image direction determination means to output the image direction determination result of the image data before the completion of the image direction determination on the image data, in accordance with inputting of new image data which is input after the image data by said image input means.

17. The apparatus according to claim 16 further comprising input detection means for detecting input of the next image data, wherein said control means controls said image direction determination means to output an image direction determination result of the image data on detecting the completion of the image direction determination by said detection means or on detecting the input of the new image data by said input detection means.

18. The apparatus according to claim 16, wherein said control means controls said image direction determination means to output the image direction determination result of the image data when the new image data is input by said image input means before detecting the completion of the image direction determination by said detection means and when said detection means detects the completion of the image direction determination before the new image data is input.

19. A method of controlling an image processing apparatus which has image input means for inputting image data, and image direction determination mean for determining an image direction of an image data input by said image input means, comprising steps of:

detecting a completion of an image direction determination on the image data by said image direction determination means;

controlling said image direction determination means to output an image direction determination result of the image data in accordance with detecting of the completion of the image direction determination on the image data; and controlling said image direction determination means to output an image direction determination result of the image data before the completion of the image direction determination on the image data, in accordance with inputting of new image data which is input after the image data by said image input means.

20. A computer readable memory which stores a control program for an image processing apparatus, which has image input means for inputting image data and image direction determination means for determining an image direction of an image data input by said image input means, wherein the control program causes the image processing apparatus to perform steps of:

detecting a completion of the image direction determination on the image data by said image direction determination;

controlling said image direction determination means to output an image direction determination result of the image data in accordance with detecting of the completion of the image direction determination on the image data; and controlling said image direction determination means to output an image direction determination result of the image data before the completion of the image direction determination on the image data, in accordance with inputting of new image data which is input after the image data by said image input means.

* * * * *

UNITED STATES PATENT AND TRADEMARK OFFICE
CERTIFICATE OF CORRECTION

PATENT NO. : 6,377,705 B1
DATED : April 23, 2002
INVENTOR(S) : Mitsuhiko Sato et al.

It is certified that error appears in the above-identified patent and that said Letters Patent is hereby corrected as shown below:

<u>Title page,</u>
Item [57], ABSTRACT,
Line 9, "assembly" should read -- assemble --.

<u>Column 1,</u>
Line 18, "direction the" should read -- direction of the --; and
Line 20, "need" should read -- needs. --

<u>Column 4,</u>
Line 23, "potion," should read -- portion --.

<u>Column 8,</u>
Line 42, "tens," should read -- tens of --; and
Line 48, "in." should read -- in --.

<u>Column 13,</u>
Line 47, "started" should read -- be started --.

<u>Column 20,</u>
Line 18, "mean" should read -- means --.

Signed and Sealed this

Twenty-third Day of July, 2002

Attest:

JAMES E. ROGAN
*Attesting Officer*     *Director of the United States Patent and Trademark Office*